United States Patent [19]
Stinson

[11] Patent Number: 5,987,393
[45] Date of Patent: Nov. 16, 1999

[54] METHOD OF CONFIGURING A MICROPROCESSOR-BASED RELAY FOR USE IN OVERCURRENT PROTECTION

[75] Inventor: Peter J. Stinson, Wind Gap, Pa.

[73] Assignee: ABB Power T&D Company Inc., Raleigh, N.C.

[21] Appl. No.: 08/803,125

[22] Filed: Feb. 20, 1997

[51] Int. Cl.⁶ ..................................................... H02H 3/08
[52] U.S. Cl. ........................... 702/105; 702/58; 702/64; 364/528.28; 361/94
[58] Field of Search ................................ 702/105, 58, 64; 361/94, 97, 87, 63; 364/151–153, 194, 528.27, 528.28, 528.29

[56] References Cited

U.S. PATENT DOCUMENTS

| | | | |
|---|---|---|---|
| 3,694,636 | 9/1972 | Smith, Jr. .......................... | 364/472.05 |
| 4,017,766 | 4/1977 | Vercelloti et al. . | |
| 4,672,501 | 6/1987 | Bilac et al. ............................... | 702/58 |
| 4,722,059 | 1/1988 | Engel et al. ............................ | 364/483 |
| 4,795,983 | 1/1989 | Crockett et al. ........................ | 361/76 |
| 4,937,757 | 6/1990 | Dougherty ......................... | 364/528.28 |
| 4,972,290 | 11/1990 | Sun et al. ................................ | 361/64 |
| 5,220,479 | 6/1993 | Fraisse ..................................... | 361/97 |
| 5,251,157 | 10/1993 | Prather ................................... | 702/105 |
| 5,325,315 | 6/1994 | Engel et al. ............................ | 702/105 |
| 5,754,446 | 5/1998 | Fisher, Jr. et al. ...................... | 702/45 |

OTHER PUBLICATIONS

"Standard Inverse–Time Characteristic Equations For Overcurrent Relays," IEEE, PC37.112 Draft #9, Dec. 20, 1994, pp. 1–15.

"IEEE Standard Inverse–Time Characteristic Equations for Overcurrent Relays", IEEE Standards Department, Sponsored by the Relay Standards Subcommittee of the Power System Relaying Comittee, Jan. 9, 1996, PC37.112, Draft #11, 1–17.

*Primary Examiner*—James P. Trammell
*Assistant Examiner*—Cuong H. Nguyen
*Attorney, Agent, or Firm*—Woodcock Washburn Kurtz Mackiewicz & Norris LLP

[57] ABSTRACT

A system for generating a time overcurrent curve from a set of time and current inputs. The overcurrent curve is generated by simultaneously finding four coefficients of a standard overcurrent equation. Two of the coefficients are found by successive approximation and two of the coefficients are found via a least squares fit approximation. After the coefficients are found, they are used in the standard overcurrent equation to produce a set of data points indicative of the overcurrent curve. The data points are transferred to an overcurrent relay for the detection of overcurrent conditions.

18 Claims, 5 Drawing Sheets

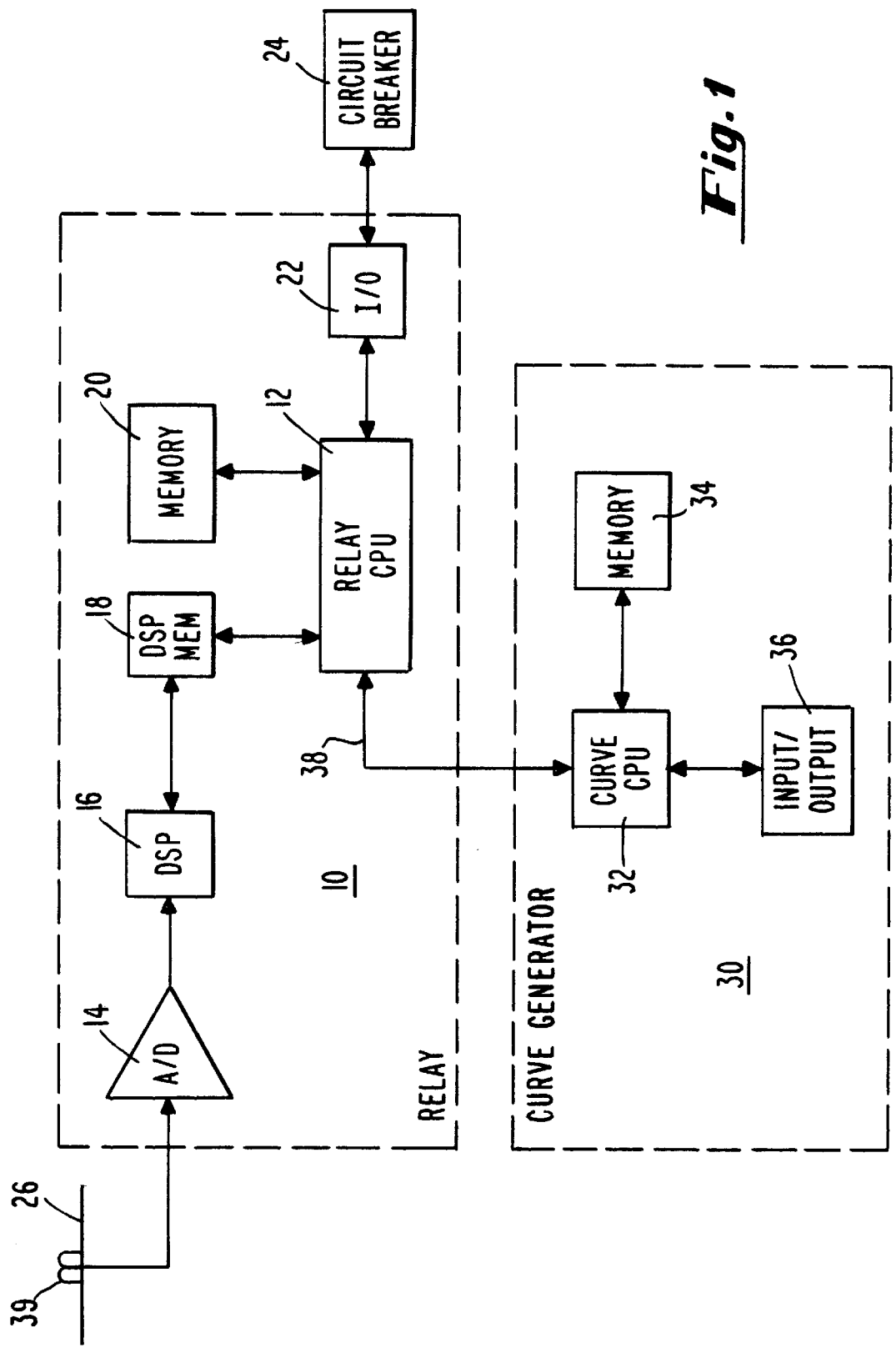

METHOD OF CONFIGURING A MICROPROCESSOR-BASED RELAY FOR USE IN OVERCURRENT PROTECTION

FIELD OF THE INVENTION

The invention relates to protective relays and in particular to methods of configuring a microprocessor-based protective relay with user-defined time-overcurrent curves.

BACKGROUND OF THE INVENTION

Current microprocessor-based overcurrent relays operate on standard time-overcurrent trip characteristics. Those standards evolved as the technology of relays progressed from the initial electro-mechanical relays to solid state relays to the current microprocessor-based relays. When overcurrent relays were first developed they employed electro-mechanical switching mechanisms to provide the required overcurrent protection. Such electro-mechanical switching mechanisms, such as induction-disk type relays, exhibited certain time response characteristics. Accordingly, as the electro-mechanical relays became entrenched in the industry, their characteristic time-overcurrent response characteristics became standardized, resulting in the development of generally accepted families of overcurrent curves. Subsequently, as overcurrent relay development progressed to solid state devices, the solid state devices were designed to emulate standard electro-mechanical like overcurrent curves. These standard overcurrent curves were likewise emulated by the microprocessor-based relays that followed the solid state relays.

The solid state devices that developed used a series of linear segments to emulate the non-linear characteristics of the electro-mechanical relays. U.S. Pat. No. 4,017,766 (Vercellotti et al.), issued in 1977, discloses a solid state overcurrent relay that purportedly emulates the standard overcurrent curves via a series of successive linear time-overcurrent segments. By concatenating the linear segments Vercellotti emulated the non-linear electromechanical overcurrent relay characteristics. In this way, all the benefits of solid-state devices were brought to bear on the relay arts while accepted standard performance characteristics were maintained.

Eventually, the overcurrent relay industry adopted microprocessor-based mechanisms that emulated the earlier solid state devices, but with the added flexibility gained by a microprocessor. For example, the microprocessor-based relay overcurrent response curves could be quickly and relatively easily changed by reprogramming the relay. That is, microprocessor-based relays employ linear segments to emulate non-linear time-overcurrent characteristics. However, the linear segments could be rather easily changed to provide different time-overcurrent characteristics. For example, by simply changing data points (i.e., line segmented points), a previously installed relay time-overcurrent characteristic is altered to accommodate changes in the system in which it is employed. As a result, the useful life of a relay was extended because it could adapt to changing characteristics of the circuit.

Eventually, ANSI standards emerged that provided a standard time-overcurrent equation representative of the time-overcurrent response curves used by microprocessor-based overcurrent relays. The current proposed ANSI standard equation, per Draft ANSI standard C37.112, is defined below:

$$t = \frac{A}{M^P - 1} + B \quad (1)$$

where:

t is the trip time in seconds;

M is a current ratio that is equal to I divided by $I_P$;

I is equal to the expected input current;

$I_p$ is equal to the pickup set point current (i.e., the relay current set point as is well know to those of ordinary skill in the art);

A is selected for the desired curve slope characteristic and must be greater than zero;

P is selected for the desired curve characteristic and must also be greater than zero; and B is selected for the desired time to trigger offset.

Notably, the ANSI standard is asymptotic to the time axis. That is, as the value of $M^P$ approaches one, t approaches infinity. Many applications find this to be an undesirable characteristic. Accordingly, the ANSI equation has been modified to define a value of t when $M^P$ is equal to one. Many microprocessor-based relays employ the modified ANSI equation of the form:

$$t = \frac{A}{M^P - C} + B \quad (2)$$

where C is less than or equal to one and the other variables are the same as in equation (1). This equation is often referred to as the modified ANSI standard.

In some conventional microprocessor-based relays, the values for the coefficients A, B, C and P in equations (1) and (2) are provided by the user to a computer which then computes a set of data points representing linear line segments representative of the desired non-linear overcurrent curve. Those line segments are then communicated to the microprocessor-based relay.

The present inventor has recognized that the prior art systems require a user to know the coefficients representative of a particular non-linear curve; however, the coefficients are difficult to derive from a graphical representation. In fact, the inventor has recognized that the user may not have ready access to the coefficients. Thus, there is a need for a system and method for supplying overcurrent curve data to an overcurrent relay that overcomes the drawbacks of the prior art.

SUMMARY OF THE INVENTION

The present invention provides a system and a method of generating an overcurrent curve for use in a microprocessor-based relay based on user defined data points. The user inputs a first set of data points indicative of an overcurrent curve. The overcurrent curve conforms to an equation of the form:

$$t = \frac{A}{M^P - C} + B$$

where:

t is the trip time in seconds;

M is equal to I divided by $I_P$;

I is equal to the input current;

$I_P$ is equal to the pickup set point current;

A is selected for the desired curve characteristic and must be greater than zero;

P is selected for the desired curve characteristic and must also be greater than zero; and B is selected for the desired curve offset.

The first set of data points are then fit to an overcurrent curve such that coefficients of the predefined overcurrent equation are determined (i.e., A, B, C and P are derived). A least squares fit method, for example, can be used to fit the data points. After the coefficients are determined, the equation is then used to generate a second set of data points indicative of the fitted overcurrent curve.

The data points indicative of the fitted overcurrent curve are then available to be transferred and/or stored in a microprocessor-based relay for use in overcurrent protection.

The overcurrent equation defined above is a general overcurrent equation. The equation can be adapted to a proposed ANSI standard equation by setting the coefficient C to the value of one.

Moreover, instead of transferring data points indicative of the fitted overcurrent curve, the coefficients could be transferred to an overcurrent relay and used directly in the detection of overcurrent conditions. Most of the current microprocessor-based relays use linear segments to emulate the non-linear overcurrent curve; however, as microprocessor-based relays advance, such devices may employ the non-linear overcurrent equation directly.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed.

In the drawings:

FIG. 1 is a schematic diagram of a system for providing overcurrent protection in accordance with the present invention;

DETAILED DESCRIPTION OF A PREFERRED EMBODIMENT

Figure 2A:
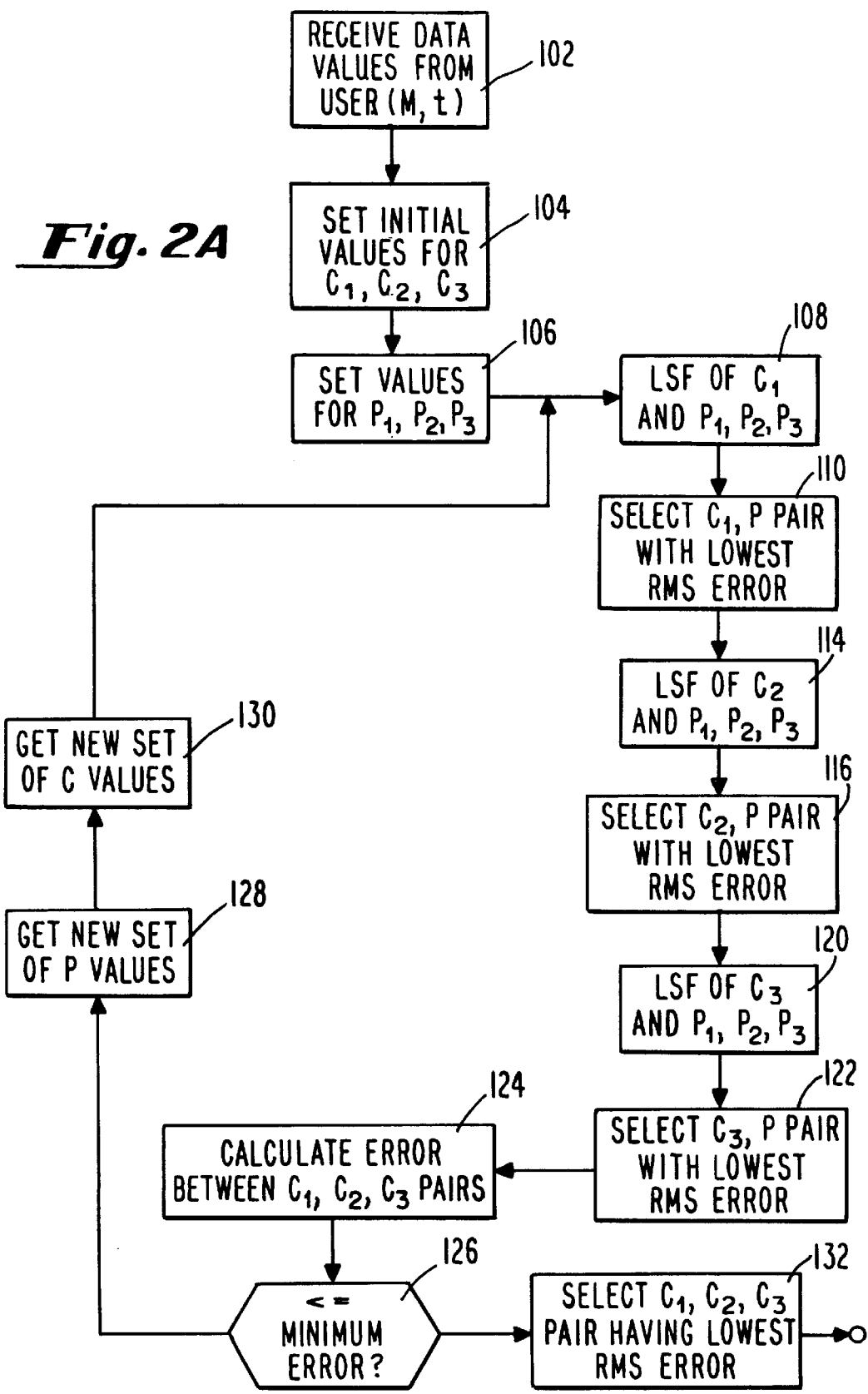
FIG. 2A is a first portion of a flow chart of the process of generating a time overcurrent curve according to the present invention.

According to a presently preferred embodiment a system and method for generating a time overcurrent curve for use in an overcurrent relay will now be described with reference to the figures. It will be appreciated by those of ordinary skill in the art that the description given herein with respect to those figures is for exemplary purposes only and is not intended in any way to limit the scope of the invention. For example, the overcurrent curve generation device will be described herein as a separate device from the overcurrent relay. However, the separate device used in the overcurrent curve generation is merely for the purpose of clearly describing the present invention and is not intended as a limitation. The curve generation method could be provided as a software package that operates directly on the relay.

I. System Description

Referring now to FIG. 1, there is shown a system of the present invention. A relay 10 connects to electrical line 26 via current transformer 39. Additionally, relay 10 connects to curve generator 30 via data bus 38. The operation of relay 10 is independent from curve generator 30. That is, curve generator 30 provides a time-overcurrent curve to relay 10, which in turn uses that curve to determine when to send a signal to circuit breaker 24 based on the current in electrical line 26.

Relay 10 can be implemented in a commercially available relay, such as the DPU-2000R manufactured by ABB Power T&D Company. Relay 10 comprises an analog-to-digital converter (A/D) 14, a digital signal processor (DSP) 16, a relay CPU 12, an input/output circuit 22 and supporting memory (DSP memory 18 and main memory 20). A/D 14 is connected to current transformer 39 and samples a signal representative of line current, converting the analog signal received to a set of digital data points. The digital data points are provided from A/D 14 to DSP 18, which in turn converts the incoming set of digital data points to current phasors. The current phasors are stored in DSP memory 18 where they can be accessed and used by relay CPU 12. Relay CPU 12 uses the current phasors to make a trip determination. If a trip condition is warranted, relay CPU 12 provides a signal to circuit breaker 24 via I/O circuit 22 to open the circuit. The trip determination is made by comparing the incoming current phasor to a time-overcurrent curve, which is stored in memory 20 and is provided by curve generator 30.

Curve generator 30 comprises a curve CPU 32, a memory 34 and input and output devices 36, such as a keyboard and CRT pair. For example, curve generator 30 can be implemented in a commercially available personal computer having software according to a method described herein. Curve generator 30 calculates and provides a set of data points representative of a time-overcurrent curve to relay 10. As such, the curve data generated by curve generator 30 can be transferred to relay 10 via disk (not shown) or via a bus connection. In a disk connection, the data indicative of the calculated overcurrent curve is downloaded to a disk attached to curve generator 30; the disk is then transported to relay 10 and uploaded into relay memory 20. In FIG. 1, the connection between curve generator 30 and relay 10 is shown as a data bus 38, such as RS-232C. In a bus connection configuration, the data points can be communicated to relay 10 electronically.

II. Method of Generating Overcurrent Curves

Figure 2B:
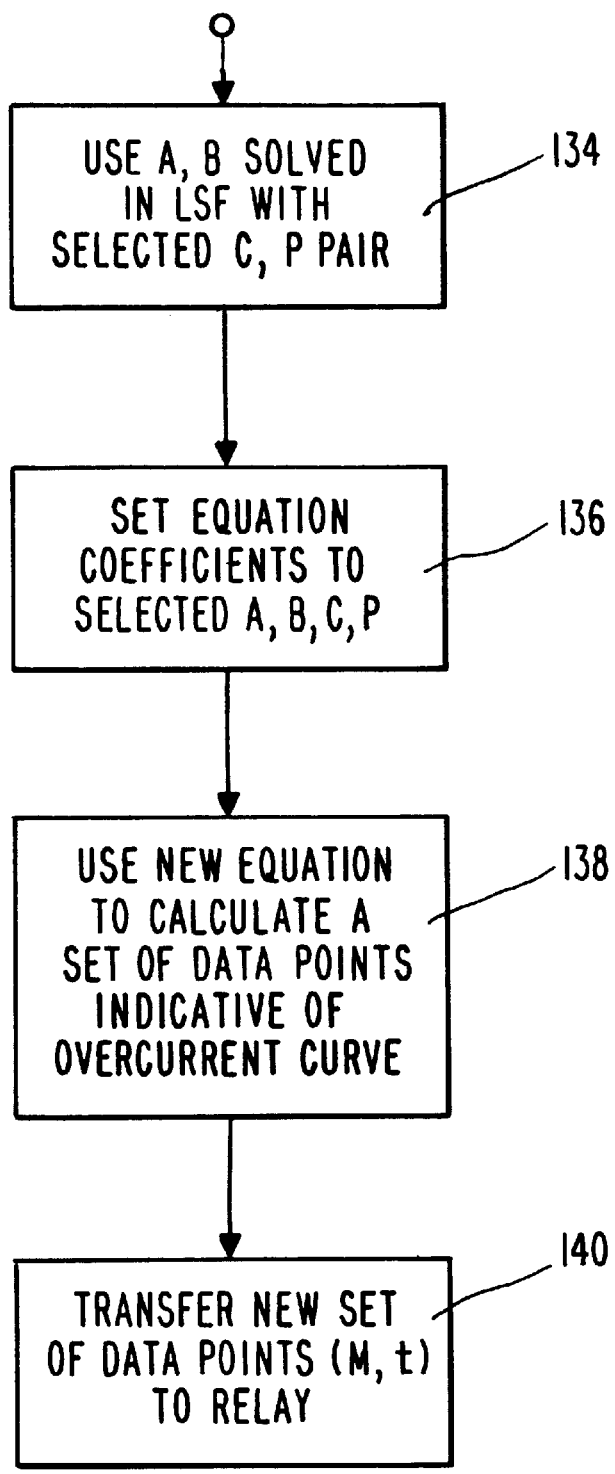
FIG. 2B is a second portion of a flow chart of the process of generating a time overcurrent curve according to the present invention.
Figure 3:
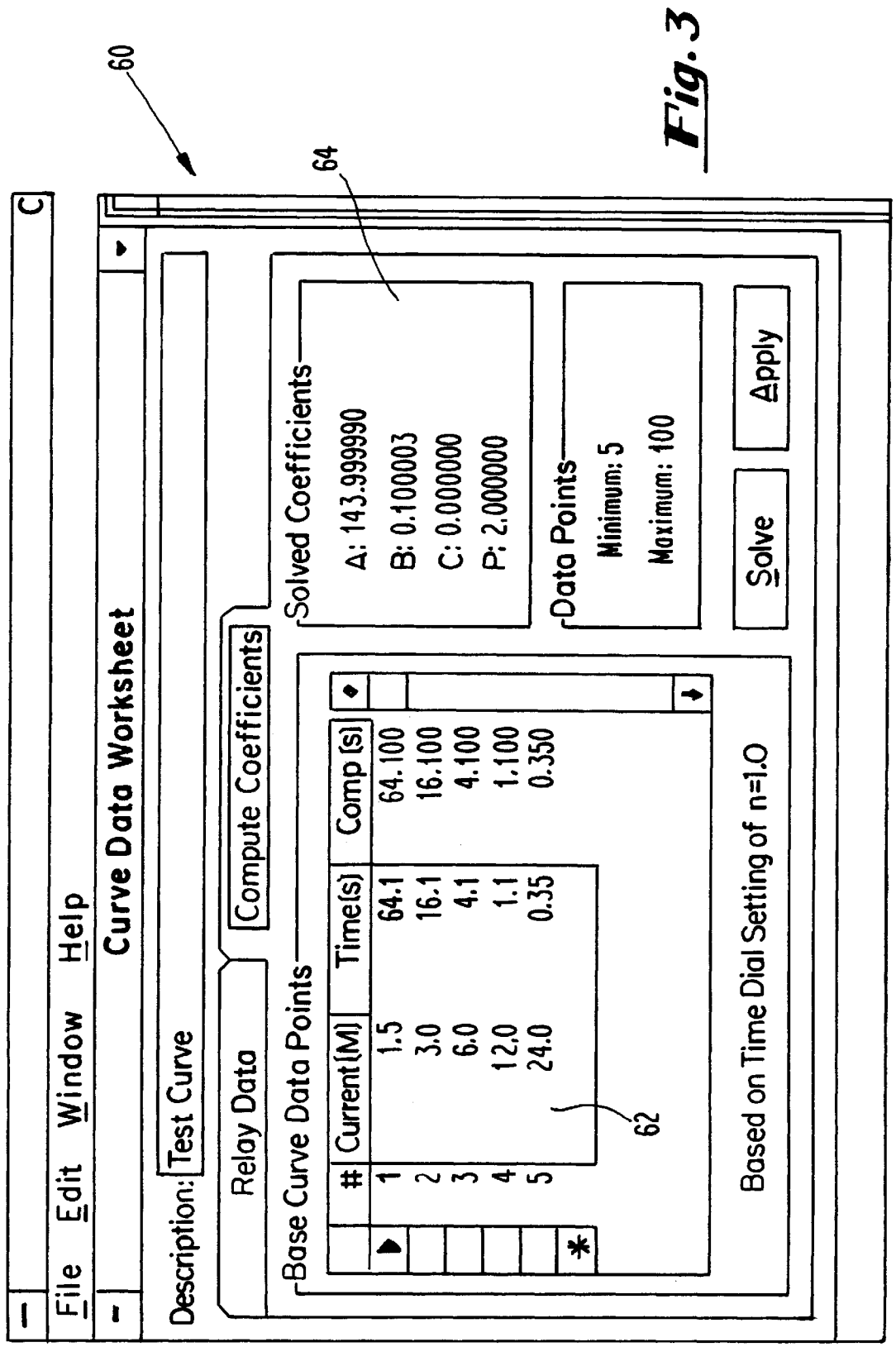
FIG. 3 is a pictorial representation of a worksheet for entering data for generating the time overcurrent curve; and, FIG. 4 is a graphical representation of data points along a corresponding exemplary time-overcurrent curve.
Figure 4:
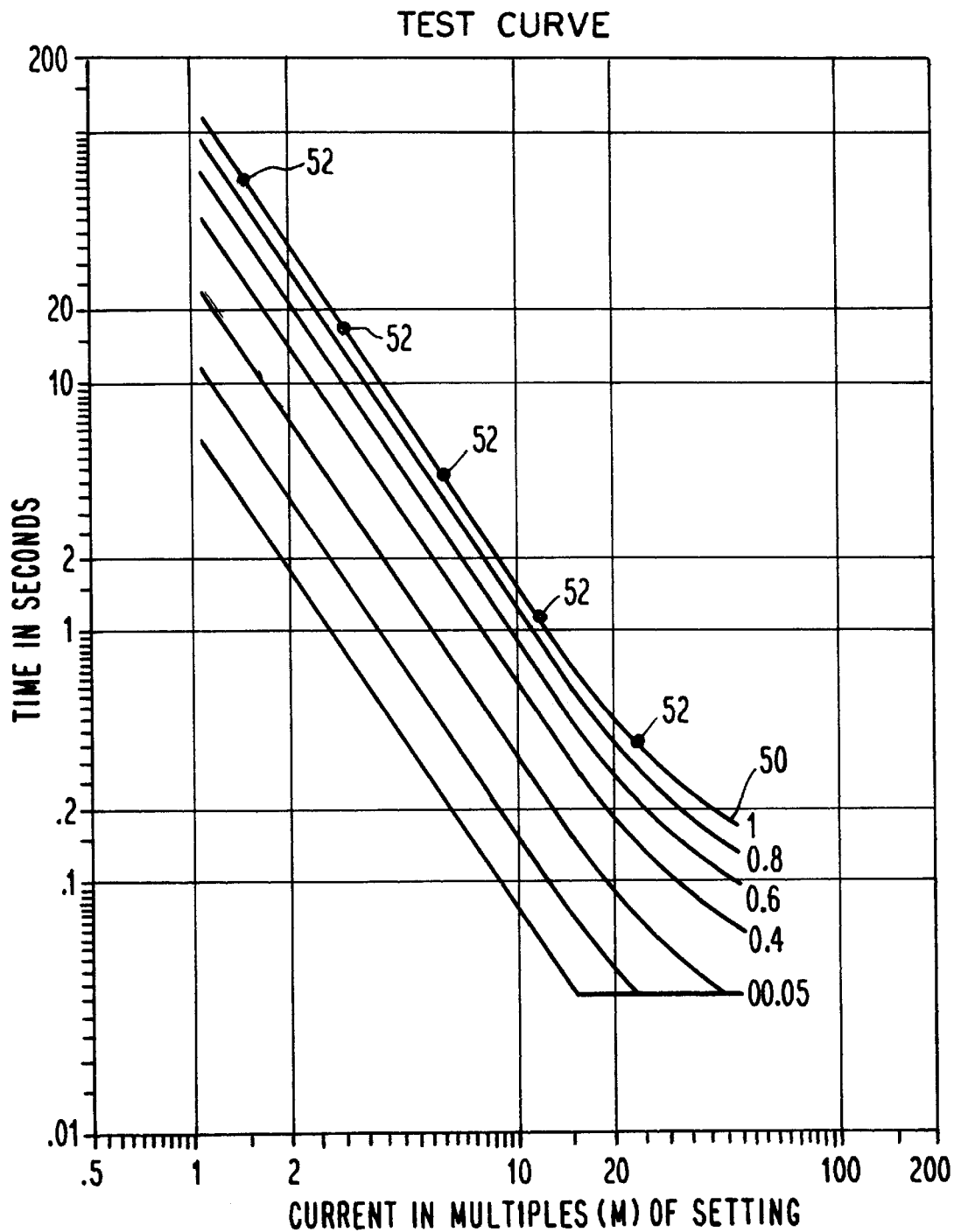

The method of generating overcurrent curves is best understood in reference to the flow charts of FIGS. 2A and 2B in conjunction with the data input screen of FIG. 3 and the exemplary overcurrent curves of FIG. 4. As described above, the overcurrent curves generally conform to an equation of the form shown in equation (2). Accordingly, the user can describe the desired overcurrent curve by providing a set of coefficient values (i.e., A, B, C and P); however, if the coefficients are unavailable or not easily determined, the user can describe the curve via x and y (i.e., M and t) coordinates. As described more fully below, in the latter case a curve fitting is performed to automatically determine the best corresponding coefficient values. In the initial step of generating an overcurrent curve, a user defines data points along a sample curve via time and current variables (step 102). FIG. 3, provides an exemplary data input worksheet 60. As shown in worksheet 60, a user enters values for current ratio (M) and corresponding times (t) into window 62. The data points entered can be fit to either a curve conforming to the ANSI standard as shown in equation (1) or the modified ANSI standard shown in equation (2) as selected by the user. The input data points are then used to produce the coefficients A, B, C and P, as shown in box 64 for the exemplary data input.

FIG. 4 shows an exemplary time-overcurrent curve 50 with data points 52. From the desired time-overcurrent curve, the user selects N data points (for example, the five data points 52 from curve 50) and enters them into curve generator 30 via I/O device 36. Notice that the five data points shown in FIG. 4 correspond to the five pairs of data points entered into window 62 of FIG. 3. Presently, the minimum number of data points to get an acceptable fit is five; however that number could be adjusted for more or less accuracy.

In general, the data points are used to determine the coefficients for A, B, C and P in equations (1) or (2) by recursively fitting the points to a curve of the form:

$$y = Ax + B \quad (3)$$

where:

y is equal to t; and x is equal to $$\frac{1}{M^P - C};$$

M and C are defined above with respect to equation (2). The data points are fit using a least squares method as shown below:

$$\begin{bmatrix} N & \sum_{i=1}^{N} x_i \\ \sum_{i=1}^{N} x_i & \sum_{i=1}^{N} x_i^2 \end{bmatrix} \cdot \begin{bmatrix} B \\ A \end{bmatrix} = \begin{bmatrix} \sum_{i=1}^{N} y_i \\ \sum_{i=1}^{N} x_i y_i \end{bmatrix} \quad (4)$$

where i is a count ranging from 1 to N.

At this juncture, only M and t (i.e., y) are known. Coefficients A, B, P and, where required, C are unknowns and must be determined somewhat simultaneously. More specifically, for $x_i$ in equation (4) only M, the input value, is known; coefficients P and C remain unknown and must be determined. As described more fully below, the values for coefficients P and C are determined by searching through a range of P and C values and finding a pair of values that provide an RMS error value less than an acceptable minimum. The search is aided by knowledge about restraints that apply to coefficients P and C. For example, P must be greater than zero and C must be less than or equal to one. Using the restraints on coefficients P and C, an initial range of value is selected for P and C using a best guess method. The values for P and C are then continuously adjusted from the pre-defined values until a least squares fit calculation produces a sufficiently small error.

To find values for coefficients P and C, an initial set of three best guess values are selected. Then, the guessed values are adjusted based on the error value returned from the least squares fit. To that end, the C values are set to initial values (e.g., $C_1=0$, $C_2=0.5$ and $C_3=1$) and the P coefficients are set to initial values (e.g., $P_1=0.01$, $P_2=2$ and $P_3=3.99$) (steps 104–106). The three initial P and C coefficient values are selected somewhat arbitrarily to provide one value at the high end of the expected range, one value at the low end of the expected range and one value in the middle of the expected range. For example, the preselected P coefficient values are selected to satisfy the relation:

$$P_2 - P_1 = P_3 - P_2 \quad (5)$$

The initial C coefficient values are selected according to a similar relation. These preselected values are used as a starting point to search for P and C values that provide the smallest RMS error when used in the least squares fit of equation (4) above.

Next, for each of the three selected C coefficient values, a P coefficient value is found that produces the smallest error. First, a least squares fit is performed for each $C_1$ and P (i.e., $P_1$, $P_2$ and $P_3$) coefficient combination (step 106). Of the three $C_1$ and P coefficient combination the pair that produces the smallest error is selected (step 110). Next, the process is repeated with the $C_2$ coefficient value. Again, three least squares fits are performed, one for each $C_2$ and P coefficient combination (step 114). As with the $C_1$ coefficient pairs, the $C_2$ and P coefficient pair that produced the smallest RMS error are selected (step 116). Finally, the process is repeated for the $C_3$ and P coefficient pair (steps 120–122). Of course, the order of the C and P coefficient determination is somewhat arbitrary.

Thus, there should be three pairs of coefficient combinations, one for each C value. For each C and P coefficient pair, an RMS error which resulted from the least squares fit (i.e., $\epsilon_1$, $\epsilon_2$ and $\epsilon_3$), is also available. The RMS error $\epsilon$ is determined according to the equation (6) below:

$$\varepsilon = \left[ \frac{\sum (y_i - Ax_i - B)^2}{N - 1} \right] \quad (6)$$

These RMS errors are used to determine differences in RMS error, $\Delta\epsilon$, between the coefficient pairs as follows:

$$\Delta\epsilon_a = \epsilon_2 - \epsilon_1 \quad (7)$$

and, $$\Delta\epsilon_b = \epsilon_3 - \epsilon_2 \quad (8)$$

The $\Delta\epsilon$ values are then checked against a predetermined minimum acceptable error. If either $\Delta\epsilon_a$ or $\Delta\epsilon_b$ is less than or equal to the minimum acceptable error value preset by the user, then the search for C and P coefficient values is complete: the pair having the smallest RMS error of the three is selected (steps 126–132). On the other hand, if both $\Delta\epsilon$ values are greater than the preset minimum acceptable error value, new values are selected for the C and P coefficients according to the relation defined below (steps 126–130), and the process is repeated until an acceptable value for $\Delta\epsilon$ is found.

New values for P are chosen as follows:

If $\epsilon_1 < \epsilon_2$ and $\epsilon_1 < \epsilon_3$, the next set of P values are selected as:

$$P_1' = 2P_1 - P_2 \quad (9)$$

$$P_2' = P_1 \quad (10)$$

$$P_3' = P_2 \quad (11)$$

P cannot be less than zero; otherwise, equation (1) ceases to be of the inverse time characteristic. Accordingly, if equation (9) is used and the value of $P_1'$ is less than or equal to zero, then the equations below are used in place of equations (9), (10) and (11):

$$P_1' = P_1 \quad (12)$$

$$P_2' = \frac{P_1 + P_2}{2} \quad (13)$$

$$P_3' = P_2 \quad (14)$$

If $\epsilon_2 < \epsilon_1$ and $\epsilon_2 < \epsilon_3$, the next set of P values are selected as:

$$P_1' = \frac{P_1 + P_2}{2} \quad (15)$$

$$P_2' = P_2 \quad (16)$$

$$P_3' = \frac{P_2 + P_3}{2} \quad (17)$$

If $\epsilon_3 < \epsilon_1$ and $\epsilon_3 < \epsilon_2$, the next set of P values are selected as:

$$P_1' = P_2 \quad (18)$$

$$P_2' = P_3 \quad (19)$$

$$P_3' = 2P_3 - P_2 \quad (20)$$

If the $\Delta\epsilon$ values are too large, a new set of C coefficient values is also selected as indicated below:

If $\epsilon_1 < \epsilon_2$ and $\epsilon_1 < \epsilon_3$, the next set of C values are selected as:

$$C_1' = 2C_1 - C_2 \quad (21)$$

$$C_2' = C_1 \quad (22)$$

$$C_3' = C_2 \quad (23)$$

If $\epsilon_2 < \epsilon_1$ and $\epsilon_2 < \epsilon_3$, set of C values are selected as:

$$C_1' = \frac{C_1 + C_2}{2} \quad (24)$$

$$C_2' = C_2 \quad (25)$$

$$C_3' = \frac{C_2 + C_3}{2} \quad (26)$$

If $\epsilon_3 < \epsilon_1$ and $\epsilon_3 < \epsilon_2$, set of C values are selected as:

$$C_1' = C_2 \quad (27)$$

$$C_2' = C_3 \quad (28)$$

$$C_3' = 2C_3 - C_2 \quad (29)$$

The entire least squares fit loop is then repeated for the newly selected C and P coefficient values (starting at step 108) until the $\Delta$s value is less than a predetermined minimum.

Referring now to FIG. 2B, after selecting a P and C coefficient pair, A and B are found as the two unknowns in the least squares fit of equation (4) (step 134). Thereafter, all of the coefficients needed for equation (2) are available. The final steps require a transfer of the information to relay 10. In the present embodiment, a new set of M and t values are transferred to relay 10. Relay 10 can then use the data points to create linear segments indicative of a non-linear overcurrent curve. Alternatively, the coefficient values could be passed directly to a relay for use in generating an overcurrent curve directly.

The above description of preferred embodiments is not intended to impliedly limit the scope of protection of the following claims. Thus, for example, except where they are expressly so limited, the following claims are not limited to a method wherein three values of C and P are preselected as other preselected numbers could obtain satisfactory results. Moreover, the claims are not limited to the specific preselected values (e.g., 0, 0.5 and 1 for C). Other preselected values could be used.

What is claimed is:

1. A method of detecting an overcurrent condition in an electrical line, said method being for use with a microprocessor-based relay, comprising the steps of:

receiving a first set of data points indicative of an overcurrent curve;

fitting said first set of data points to a time-overcurrent curve such that coefficients of a predefined overcurrent equation are determined;

generating a second set of data points indicative of said fitted time-overcurrent curve by using said overcurrent equation and said coefficients; and comparing a measured value indicative of a current to said second set of data points indicative of said fitted time-overcurrent curve such that said microprocessor-based relay detects an overcurrent condition when said measured value exceeds a value of current on said time-overcurrent curve for the corresponding amount of time.

2. The method as recited in claim 1 wherein the step d) of generating said second set of data points is performed by a curve generating device and wherein the step e) of comparing said value indicative of current is performed by the microprocessor-based relay.

3. The method as recited in claim 1 wherein said predefined overcurrent equation is of the form:

$$t = \frac{A}{M^P - C} + B$$

where:

t is the trip time in seconds;

M is equal to I divided by $I_P$;

I is equal to the input current;

$I_p$ is equal to the pickup current;

A is selected for the desired curve characteristic and must be greater than zero;

P is selected for the desired curve characteristic and must also be greater than zero; and B is selected for the desired curve offset.

4. The method as recited in claim 3 wherein the coefficient C has the value of one.

5. The method as recited in claim 1 wherein the step b) comprises the use of a least squares fit equation.

6. A method for detecting an overcurrent condition in an electrical line via a data set representative of a time-overcurrent curve conforming to a time-overcurrent equation of the form:

$$t = \frac{A}{M^P - C} + B$$

where:

t is the trip time in seconds;

M is equal to I divided by $I_P$;

I is equal to the input current;

$I_p$ is equal to the pickup current;

A is selected for the desired curve characteristic and must be greater than zero;

P is selected for the desired curve characteristic and must also be greater than zero; and B is selected for the desired curve offset;

for use in an overcurrent relay, the method comprising the steps of:

a) receiving a set of data points in the form of t and M coordinates representative of a first time overcurrent curve;

b) iteratively selecting values for coefficients P and C within a predefined range;

e) fitting data points t, M and selected coefficients P and C to the overcurrent curve using a least squares fit algorithm to derive values for coefficients A and B; and, f) repeating the steps d) and e) until an error value is less than a predefined value;

g) generating an overcurrent curve using the coefficients P and C selected from step f); and h) comparing a value of current measured from the electrical line to the generated overcurrent curve such that a trip condition exists when said measured value indicative of current exceeds a curve indicated current for a curve indicated time.

7. The method as recited in claim 6 wherein the step f) comprises the steps of:

i) generating a set of data points at a curve generator device, said data points being indicative of an overcurrent curve, from said time-overcurrent equation using the coefficients A, B, P and C found in the least squares fit; and, ii) transferring said data points to an overcurrent relay.

8. The method as recited in claim 6 wherein the coefficient C is fixed at the value of one.

9. A method for generating a time-overcurrent curve for use in a relay, comprising the steps of:

a) receiving a set of data points representative of a time-overcurrent curve;

b) fitting said data points to a curve using a time-overcurrent equation to derive coefficients of the time-overcurrent equation;

c) selecting data points from the fitted curve as linear segments of a time-overcurrent curve; and d) comparing measured current values to portions of said linear segments to determine whether an overcurrent condition exists.

10. The method as recited in claim 9 wherein the step b) comprises the steps of:

i) selecting a first coefficient from a first prespecified range;

ii) selecting a second coefficient from a second prespecified range;

iii) performing a least squares fit of the data points to the fitted curve using the first and second coefficients to determine at least one other coefficient; and iv) repeating steps i) through iii) until a satisfactory error is obtained.

11. The method as recited in claim 9 wherein said time-overcurrent equation is defined by an equation the form:

$$t = \frac{A}{M^P - C} + B$$

where:

t is the trip time in seconds;

M is equal to I divided by $I_P$;

I is equal to the input current;

$I_p$ is equal to the pickup current;

A is selected for the desired curve characteristic and must be greater than zero;

P is selected for the desired curve characteristic and must also be greater than zero; and B is selected for the desired curve offset.

12. The method as recited in claim 11 wherein said first coefficient is C and said second coefficient is P.

13. The method as recited in claim 9 further comprising the using said linear segments to detect overcurrent conditions.

14. A system for generating an overcurrent curve for use in a microprocessor-based relay, comprising:

a) a means for receiving a first set of data points indicative of an overcurrent curve;

b) a processing means for fitting said first set of data points to a fitted overcurrent curve such that coefficients of a predefined overcurrent equation are determined;

c) a processing means for generating a second set of data points indicative of said fitted overcurrent curve; and d) means for transferring said second set of data points to an overcurrent relay wherein measured current values are compared to said data points to determine an overcurrent condition.

15. The system as recited in claim 14 further comprising means for storing said second set of data points data indicative of said fitted overcurrent curve in a microprocessor-based relay for use in overcurrent protection.

16. The system as recited in claim 14 wherein said predefined overcurrent equation is of the form:

$$t = \frac{A}{M^P - C} + B$$

where:

t is the trip time in seconds;

M is equal to I divided by $I_P$;

I is equal to the input current;

$I_p$ is equal to the pickup current;

A is selected for the desired curve characteristic and must be greater than zero;

P is selected for the desired curve characteristic and must also be greater than zero; and B is selected for the desired curve offset.

17. The system as recited in claim 16 wherein the coefficient C has the value of one.

18. The system as recited in claim 14 wherein the processing means for fitting comprises the use of a least squares fit equation.

* * * * *

UNITED STATES PATENT AND TRADEMARK OFFICE
CERTIFICATE OF CORRECTION

PATENT NO. : 5,987,393
DATED : November 16, 1999
INVENTOR(S) : Peter J. Stinson

It is certified that error appears in the above-identified patent and that said Letters Patent is hereby corrected as shown below:

Col. 7, line 55, "As value" should read --$\Delta\epsilon$ value--

Signed and Sealed this

Ninth Day of May, 2000

Attest:

Q. TODD DICKINSON

*Attesting Officer*      *Director of Patents and Trademarks*